A. L. GARDNER.
MEAT SLICING MACHINE.
APPLICATION FILED MAR. 7, 1912.
1,105,643.
Patented Aug. 4, 1914.
2 SHEETS—SHEET 1.
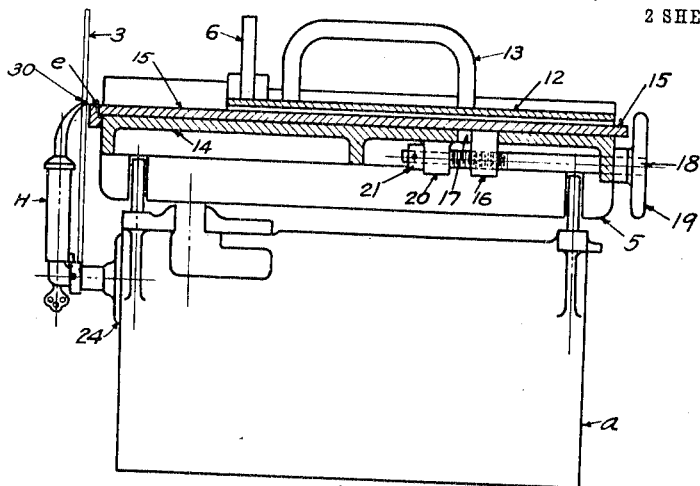
Section AA
Figure No. 2.
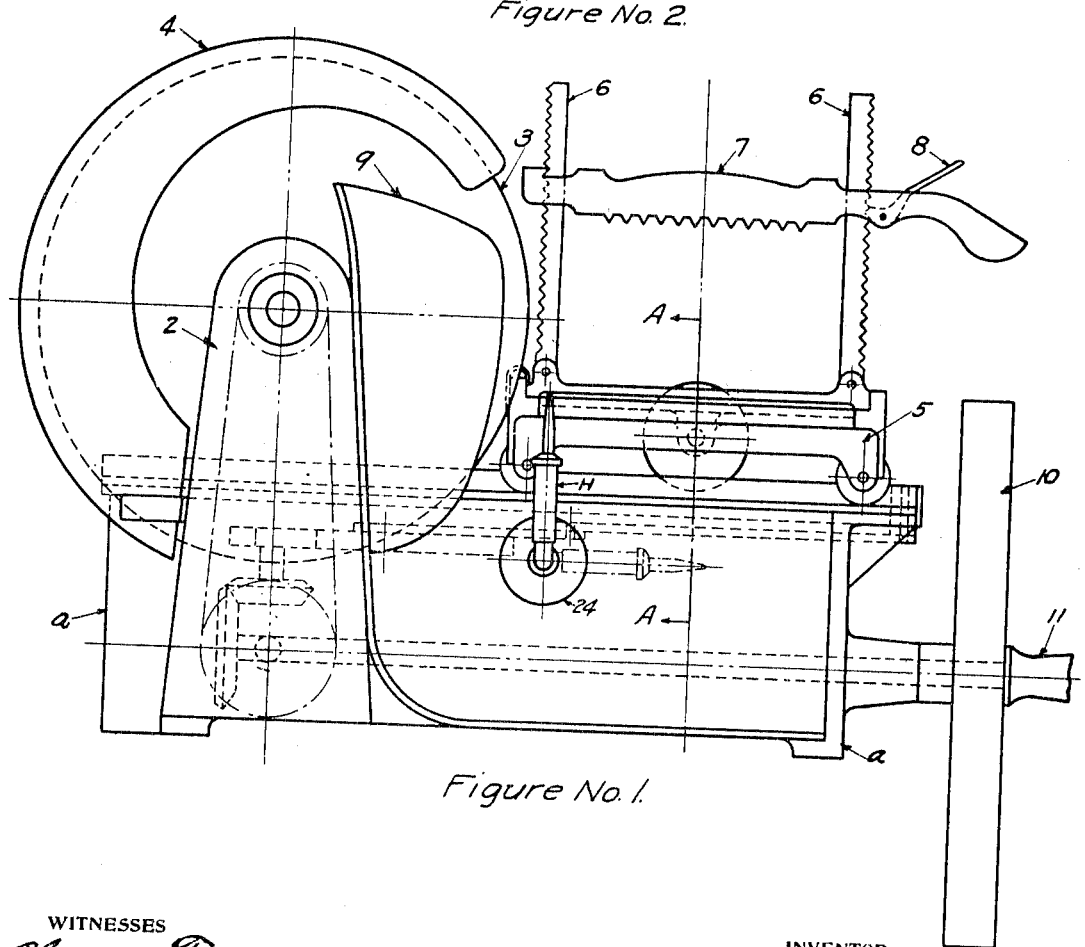
Figure No. 1.
WITNESSES
Charles Fabri
Gustav A. Lindwall
INVENTOR
Adelbert L. Gardner
BY
ATTORNEY

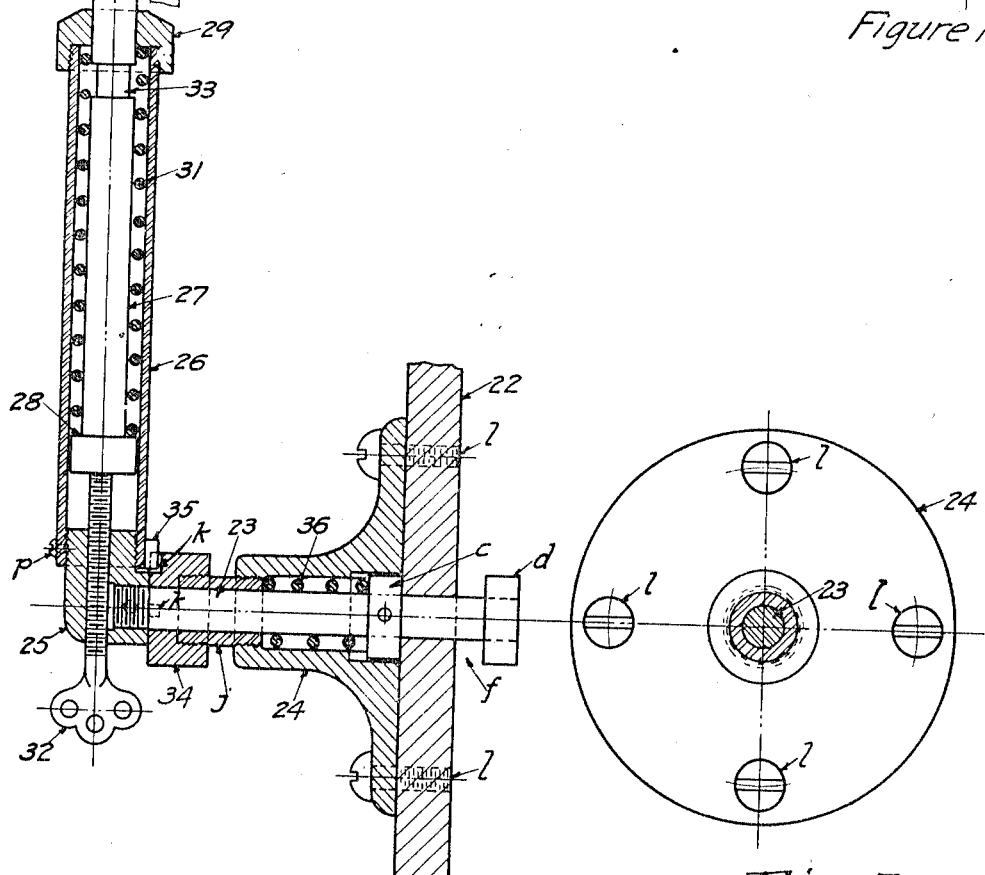
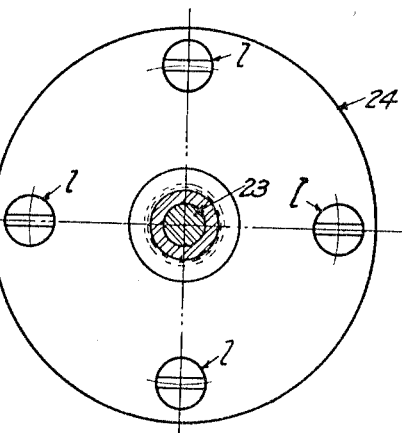

UNITED STATES PATENT OFFICE.

ADELBERT L. GARDNER, OF NORWOOD PARK, ILLINOIS, ASSIGNOR OF ONE-HALF TO CURTIS H. GARDNER.

MEAT-SLICING MACHINE.

1,105,643.   Specification of Letters Patent.   Patented Aug. 4, 1914.

Application filed March 7, 1912. Serial No. 682,170.

*To all whom it may concern:*

Be it known that I, ADELBERT L. GARDNER, a citizen of the United States, residing in the city of Chicago, Cook county, Illinois, have invented new and useful Improvements in Meat-Slicing Machines, of which the following is a specification.

My invention relates to improvement in meat slicing machines, in which a horizontally reciprocating carriage having an automatic feed device attached thereto operates in conjunction with an upright circular rotating knife, and the object of my improvement is to provide means whereby to slice the meat from the rind, leaving said rind to be removed from the uncut remainder as desired by the operator.

Heretofore it has been observed that an improvement was desired over the old way of removing the rind from a piece of meat by hand, and means have been provided for doing this automatically and during the slicing operation in order that the rind may be left on the meat as long as possible to better preserve it from contact with the air. It has been unavoidable however that after the first slice has been taken from the meat there is left an exposed raw surface, while at the same time the separated rind has been cut by the slicing knife into narrow strips, making it unavailable as a covering for such raw surface, and of no practical value as a salable product, or for any other purpose.

One of the objects therefore of the present invention is to provide means used in connection with a meat slicing machine for separating the rind from the meat without cutting or injuring it in any way, but leaving it attached to the meat at one edge in order that it may be folded over and used to cover the exposed surface of raw meat left after the slicing operations; or, if desired, may be subsequently severed by the slicing knife in a single piece, useful as a by-product, or otherwise. It is sometimes found desirable also in the operation of slicing a piece of meat to leave the rind unsevered and in one piece so that when only a small part of the meat remains unsliced, such remaining part may be turned about and slices taken from its opposite end, with the attached rind used to securely fix it upon the meat platform by placing a fresh piece of meat upon it and clamping it down.

A device embodying the principles of the present invention is illustrated in the accompanying drawings in which:

Figure 1 is a side view of the machine with improvements attached. Fig. 2 shows a vertical transverse section through the carriage and machine frame on the lines A—A of Fig. 1. Fig. 3 is a vertical sectional view of the adjustable guide improvement. Fig. 4 is a rear view of a section of the rod 27. Fig. 5 is a transverse vertical section through the horizontal shaft 23 supporting the rind stripper.

As shown in said drawings the complete machine comprises a suitable base frame indicated as a whole by $a$, having at one side a column or standard 2 in the upper part of which is journaled a circular rotary knife 3 partly incased by a shield or guard 4. The base frame $a$ is formed to provide a level top surface upon which is mounted a reciprocating meat carriage 5, with a flat top 14, arranged to move in a plane parallel and adjacent to the cutting plane of the knife 3, in order that the meat which is carried upon it may be sliced by the circular knife; and supported upon the meat carriage 5 is also a slide or shelf 12 which is adapted for feeding forward, as viewed in Fig. 1, in order to supply fresh portions of the meat to the knife 3 as the slices are taken off. Upon the slide 12 is erected a frame comprising vertical posts 6, and a movable, toothed horizontal bar 7 for securely fastening the meat to the slide; the two posts 6 having notches for engagement respectively by a hook-shaped part or notch on one end of the horizontal bar 7 and a movable pawl 8 at its other end; and the latter end being extended in the form of a handle for convenient manipulation. The knife 3 is rotated through a chain and sprockets, a horizontal shaft, and gearing, not here shown but indicated diagrammatically in dotted outline, and to one end of such horizontal shaft is fixed a balance wheel 10 with a handle 11 by means of which it is rotated. Means are also provided for reciprocatingly moving the carriage 5, to the right and left as viewed in Fig. 1, and for feeding the slide 12 forward or toward the cutting plane of the knife. A curved pan 9 is also provided for receiving the slices of meat which fall from the end of the carriage 5.

All of the foregoing parts of the device are made in accordance with well known principles.

The cutting plane of the knife lies somewhat forward of the front vertical wall 22 of the base frame $a$, and the flat top 14 of the meat carriage 5 overhangs this wall somewhat. In the usual construction the flat top of the meat carriage forms a shear in connection with the knife for properly slicing the meat; but as here shown the knife is separated some little distance from the edge of the meat carriage and for the purpose of properly supporting the part of the meat to be sliced and to form a shear in connection with the rotary knife an adjustable plate 15 is placed upon the flat top 14 of the carriage 5 between the latter and the slide 12, and such adjustable plate is formed with a forward vertical wall $e$ which supports the meat in proper relation to the slicing knife. By means of a depending lug 16, through which is made a threaded opening engaging with a threaded shaft or screw 18, the movable meat supporting plate 15 may be adjusted toward or from the cutting plane of the knife; such shaft 18 being journaled in a fixed lug 20 depending from the solid top 14 of the carriage and having a thrust collar 21 on its inner end and a hand wheel 19 on its outer end. The lug 16 is accommodated in a slot 17 through the top 14, such slot serving to limit its movement and prevent it from being brought into contact with the slicing knife.

For the purpose of separating the rind from the meat in the slicing operation a wedge-shaped rind stripper 30, which is fixed to the upper end of a long vertical, square shank 27, is supported adjacent to the forward edge of the meat supporting plate 15, such stripper being shaped to provide a thin rear edge which will wedge apart the rind and the meat when the latter is fed forward and moved from side to side; and the underside of such stripper is curved in order to turn the rind downward, as indicated in Fig. 3 where the rind is shown in dotted outline at 39. In the top part of the stripper 30 is cut a groove in which is fitted a sliding strip or point 37, made adjustable by means of a screw 38 according to the desired depth to which the stripper is to be forced into the material. The rind stripper 30 with its vertical shank 27 is supported upon the machine by means of a flanged collar 24 which is bolted to the forward vertical wall 22 of the base frame $a$. Through this collar extends a horizontal shaft 23 which projects through an opening through the wall 22 concentric with the collar and is provided with a nut or collar $d$ on its inner end. The outer end of the collar 24 is internally threaded and into it is fixed a threaded sleeve or tube $j$; and within the collar 24 is arranged a spring 36 bearing at one end against the end of such sleeve $j$ and at its other end against a flange or collar $c$ which is pinned to the shaft 23. The collars or flanges $c$ and $d$ are spaced sufficiently apart to allow the shaft 23 to be drawn outward against the force of the spring 36. A fixed collar or nut 34 is also secured to the outer end of the sleeve $j$ and the outer end of the shaft 23 is screwed into an elbow 25 which has a threaded part fixed into the lower end of a vertical tube 26 by means of a small set screw $p$. This tube supports the vertical shank 27 of the rind stripper, and from the foot of such tube extends a lug 35 adapted to engage in one of two notches $k$, $k$, in the fixed collar 34 for the purpose of securing the rind stripper in either a vertical or horizontal position. It may be adjusted into either of such positions by drawing it outward against the tension of the spring 36 to disengage the lug 35 from its notch and then rotating it through 90° into its other position. The upper end of the tube 26 is threaded and over its top is screwed a cap 29 having a square opening therethrough through which extends the square shank 27 of the rind stripper. Surrounding this shank and within the tube 26 is a coiled spring 31 bearing upon a collar or flange 28 at the lower end of the shank and pressing it downward; the lower end of the shank resting upon the upper end of a long screw 32 which is threaded upward through an opening through the elbow 25. By means of the screw 32 the rind stripper is vertically adjustable in order to provide for its proper coöperation with the adjustable supporting plate 15. Somewhat below the cap 29 the shank 27 is reduced in diameter and made cylindric, as shown at 33, so that by drawing it upward until the cylindric part is within the opening through the cap 29 the shank may be rotated in order to turn the rind stripper away from the meat when desired.

In the operation of the device the meat is placed upon the sliding platform 12 and the machine operated in the usual manner, when the rind stripper 30 will be forced between the rind and the meat in the forward feeding of the latter and its reciprocating sidewise movement and will act to direct the detached rind downward and withhold it from the cutting knife. The proper relation of the parts may be obtained by adjusting the adjustable supporting plate 15 forward or backward, by varying the height of the stripper through the screw 32, and by adjusting the length of its point through the screw 38. The height of the stripper is adjusted according to the thickness of rind, and in addition, by the yielding of the spring 31, it can accommodate itself to irregularities in such thickness. When desired, the entire stripper may be rotated about its horizontal shaft 23 into a horizontal and inoperative position.

I claim as my invention:

1. In a meat slicing machine, the combination with a meat supporting platform and a slicing knife, of a stationary rind stripper adjacent the edge of such platform, such stripper being adapted to separate the rind from the meat, and having a surface adapted to engage with such rind and withhold it from the slicing knife.

2. In a meat slicing machine, the combination with a meat supporting platform and a slicing knife, of a stationary rind stripper adjacent the edge of such platform, such stripper having a surface adapted to engage with the rind and withhold it from the slicing knife, and being vertically adjustable.

3. In a meat slicing machine, the combination with a meat supporting platform and a slicing knife, of a stationary rind stripper adjacent the edge of such platform, such stripper having a surface adapted to engage with the rind and withhold it from the slicing knife, being vertically adjustable, and having an extensible point and means for extending and retracting such point.

4. The combination with a meat slicing machine, including a base frame with a vertical front wall, a horizontal top, and a meat platform above such top, of a bracket secured to such front wall, a rind stripper supported by such bracket and adjustable about a horizontal axis, a horizontal plate interposed between the top of such base frame and such meat supporting platform, and means for adjusting such plate toward and from the rind stripper.

5. The combination with a meat slicing machine, including a base frame with a vertical front wall, a horizontal top, and a meat platform above such top, of a bracket secured to such front wall, a rind stripper supported by such bracket and adjustable about a horizontal axis, a horizontal plate interposed between the top of such base frame and such meat supporting platform, means for adjusting such plate toward and from the rind stripper, and means for adjusting such rind stripper vertically with respect to such meat platform.

6. The combination with a meat slicing machine, including a base frame having a vertical wall, of a bracket secured to such wall, a horizontal shaft journaled in such bracket, means for securing such shaft against rotation, and a rind stripper supported from the outer end of such shaft.

7. The combination with a meat slicing machine, including a base frame having a vertical wall and a horizontal top, of a bracket secured to such vertical wall, a shaft journaled in such bracket, a tube at the end of such shaft and a rind stripper having a shank sliding in such tube.

8. The combination with a meat slicing machine, including a base frame having a vertical front wall and a horizontal top, of a rind stripper secured to such front wall with its upper end adjacent the front edge of such horizontal top, an adjustable meat supporting plate upon such horizontal top, and means for adjusting such plate forward and backward to support the front edge of the meat in proper relation to such rind stripper.

9. The combination with a meat slicing machine, including a base frame having a vertical front wall and a horizontal top, of a rind stripper secured to such front wall with its upper end adjacent the front edge of such horizontal top, an adjustable meat supporting plate upon the horizontal top of such base frame, means for adjusting such plate forward and backward to support the front edge of the meat in proper relation to such rind stripper, and means for raising and lowering such rind stripper.

10. In a meat slicing machine, the combination with a reciprocally movable meat platform, and a slicing knife, of a stationary rind stripper adjacent the edge of such platform, such stripper being adapted to separate the rind from the meat and to engage and turn the uncut rind downward between said stripper and said meat platform, and to withhold said rind from contact with the edge of such slicing knife.

11. In a meat slicing machine, the combination with a slicing knife, of a meat supporting platform and a rind stripper, one of such parts being movable with respect to the other, and such stripper being adapted to separate the rind from the meat and having a surface adapted to engage with such rind and withhold it from the slicing knife.

12. In a meat slicing machine, the combination with a slicing knife, of a meat supporting platform and a rind stripper adjacent the edge of such platform, one of such parts being movable with respect to the other, and such stripper being adapted to separate the rind from the meat and having a surface adapted to engage with such rind and withhold it from the slicing knife.

13. In a meat slicing machine, the combination with a slicing knife, of a meat supporting platform and a rind stripper adjacent the edge of such platform, one of such parts being movable with respect to the other and one of them being adjustable, such stripper being adapted to separate the rind from the meat and having a surface adapted to engage with such rind and withhold it from the slicing knife.

ADELBERT L. GARDNER.

Witnesses:
 CHARLES FABRI,
 GUSTAV A. LINDWALL.